United States Patent Office 3,329,687
Patented July 4, 1967

3,329,687
THIADIAZEPINEDIOXIDES AND THEIR
PREPARATION
William J. Houlihan, Mountain Lakes, N.J., assignor to
Sandoz Inc., Hanover, N.J.
No Drawing. Filed Jan. 16, 1964, Ser. No. 338,022
8 Claims. (Cl. 260—327)

ABSTRACT OF THE DISCLOSURE

The compounds are 5H-dibenzo[c,e][1,2,7]thiadiazepine-6,6-dioxides, which may be prepared by reacting a 2,2'-diaminobiphenyl with either sulfamide or sulfuryl chloride. Said compounds are useful as sedatives and/or tranquilizers.

This invention relates to compounds and the synthesis thereof, the compounds having, as essential to their skeleton, the structure

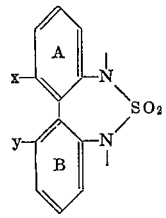

(I)

wherein each of A and B is an unsaturated ring which may either be substituted, or part of a bicyclic condensed ring system. The condensed rings may, independently, be either 5- or 6-membered rings or ring systems and may contain one or more hetero atoms as ring members, such as a nitrogen atom. $x$ and $y$ are either, separately, hydrogen atoms or, taken together —$CH_2$— or —CH=CH—. The preferred compounds are 5H-dibenzo-[c,e][1,2,7]-thiadiazepine-6,6-dioxides of the formula

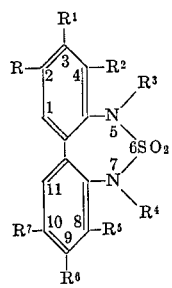

(II)

wherein each of R, $R^1$, $R^2$, $R^5$, $R^6$ and $R^7$ is, independently, either hydrogen (—H), chlorine (—Cl), bromine (—Br), fluorine (—F), trifluoromethyl (—$CF_3$), nitro (—$NO_2$), lower alkyl (e.g. alkyl having from 1 to 4 carbon atoms, such as methyl, ethyl, propyl and butyl) or lower alkoxy (e.g. alkoxy the alkyl group of which has 1 to 4 carbon atoms, such as methoxy, ethoxy, propoxy and butoxy); and
each of $R^3$ and $R^4$ is, independently, either hydrogen (—H) or lower alkyl (e.g. alkyl having from 1 to 4 carbon atoms, such as methyl, ethyl, propyl and butyl).

Compounds of the preceding structural formulae may be prepared by various routes. Where each A and B is monocarbocyclic aryl, the 2,2'-dinitrodiphenyl (IV) is prepared, e.g. according to the Ullmann Reaction (see "The Merck Index," seventh edition, 1960, page 1474):

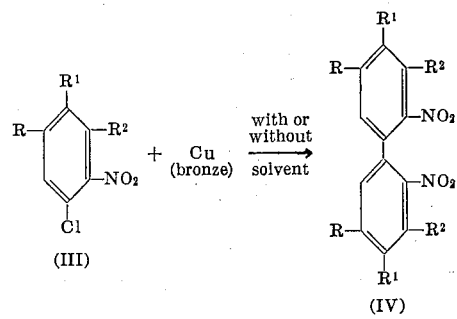

The nitro groups of (IV) are reduced either chemically or catalytically. Chemical reduction is effected, e.g. by contact with tin, zinc or iron and either a mineral (e.g. hydrochloric) or an organic (e.g. acetic) acid. Catalytic reduction is brought about by contact with hydrogen and, e.g., either Raney nickel or supported or unsupported palladium or platinum. By reduction of the nitro groups of (IV), the corresponding diamino compound (V)

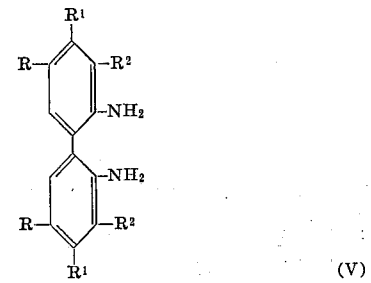

is prepared. Compounds (V) are also prepared directly from their corresponding 2,2'-dicarboxylic acids (VI) according to the reaction

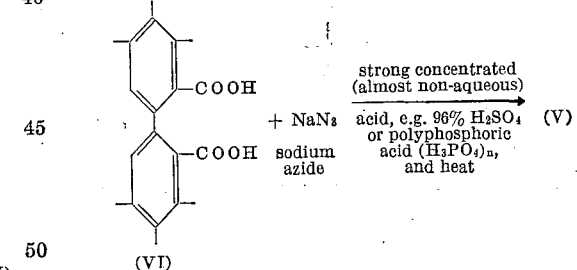

Substituents are introduced on the amino nitrogen atoms of compound (V) according to well known procedures, e.g.

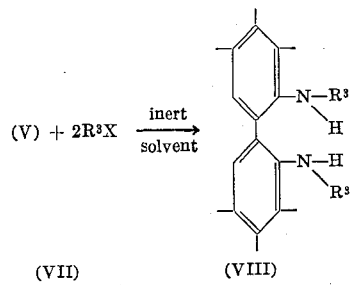

wherein $R^3$ is lower alkyl, such as methyl, ethyl, propyl and butyl;

X is a halogen, such as chlorine, bromine and iodine, or an arylsulfonate, such as

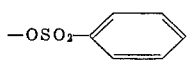

and the inert solvent is an ether, such as diethyl ether, an aromatic, such as benzene and toluene, or a tertiary amine, such as pyridine, tributylamine, quinoline, dimethyl aniline.

Alternatively, compounds (V) are subjected to Schiff Base formation (see "The Merck Index," supra, page 1466) to give the corresponding bis-Schiff-Bases, which are catalytically hydrogenated according to the same procedure as outlined above for the catalytic reduction of compounds (IV)

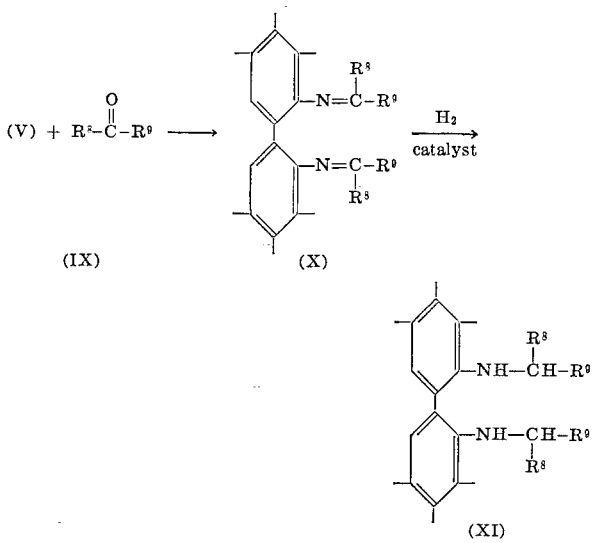

wherein $R^8$ is lower alkyl, e.g. methyl, ethyl and propyl; and $R^9$ is either hydrogen (—H) or lower alkyl, e.g. methyl, ethyl and propyl.

Compound (XI) corresponds to compound (VIII) wherein each $R^3$ is

Using the Schiff Bases as intermediates, branch chain as well as straight chain alkyl substituents are introduced as $R^3$.

The second step of the synthesis is the formation of the thiadiazepine ring. This is readily effected by reaction with sulfamide when the diamine employed is compound (V).

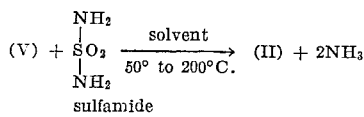

Compound (II) prepared according to this scheme always has hydrogen (—H) as both $R^3$ and $R^4$. As solvent it is preferred to use a tertiary amine, such as trialkylamine, e.g. triethylamine, an aryldialkylamine, e.g. phenyldimethylamine, a diarylalkylamine, e.g. diphenylethylamine, and a triarylamine, e.g. triphenylamine; but other solvents may also be employed. Examples of other suitable solvents are: pyrrole, alkyl pyrrole, alkoxy pyrrole, pyridine, alkyl pyridine, alkoxy pyridine, quinoline, alkyl quinoline, alkoxy quinoline N-alkyl morpholine, N-aryl morpholine, N,N'-dialkyl piperazine, N-N'-aralkyl piperazine and N-N'-diarylpiperazine. [In the enumeration of solvents each alkyl is preferably lower alkyl, e.g. methyl, ethyl and propyl; each alkoxy is preferably lower alkoxy, e.g. methoxy, ethoxy and propoxy; and each aryl (or ar-) is preferably phenyl.]

For the reaction with sulfamide stirring is preferred, but is not necessary. The reaction time is from one to five hours.

When $R^3$ and/or $R^4$ is other than hydrogen (—H), ring closure must be effected according to a different scheme

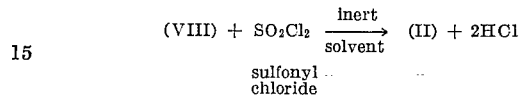

Any inert solvent can be used, e.g. alkylethers, such as diethylether; hydrocarbons, such as benzene and toluene; lower mono-, di-, tri- and poly-chloralkanes, such as 1-propyl chloride, 1,1-dichloroethane, 1,1,3-trichloropropane; cyclic monoethers such as tetrahydrofuran, and cyclic diethers, such as dioxane. In addition to the inert solvent one or more tertiary amines, such as enumerated for the reaction with sulfamide, may also be present as part of the reaction mixture.

For this reaction stirring is necessary. The reaction takes from one to five hours and may be effected at a temperature from —50° to 0° C.

Compounds (I) are therapeutically acceptable with respect to toxicity and are useful as CNS depressants. High doses of 5H-dibenzo[c,e][1,2,7]thiadiazepine-6,6-dioxide produce a profound CNS depression and an associated neurological deficit. In doses which do not produce overt signs of neurological deficit, said compound effects moderate anti-convulsive and analgesic activity and also some anti-inflammatory effect. This compound also produces a pronounced but brief hypotension when injected intravenously in anesthetized dogs.

3,9 - di - trifluoromethyl - 5H - dibenzo[c,e][1,2,7] thiadiazepine - 6,6 - dioxide has a stronger anti-inflammatory effect than 5H-dibenzo[c,e][1,2,7]thiadiazepine-6,6-dioxide and may be used accordingly.

In general Compounds I may be used as sedatives and/or tranquilizers.

Further details of the preparation of typical compounds according to this invention are presented in the following examples. These are merely illustrative. Any combination of substituents can be obtained by an appropriate selection of reactants. In the examples, unless otherwise specified, all parts are by weight, all temperatures are in degrees centigrade, and the relationship between parts by weight and parts by volume is the same as that between grams and cubic centimeters.

*Example 1.*—*5H-dibenzo[c,e][1,2,7]thiadiazepine-6,6-dioxide*

Charge a flask equipped with a stirrer and a condenser attached to a bubble detector with 8.0 grams (g.), i.e. 0.043 mole) of 2,2'-diamine biphenyl, 5.0 g (0.052 mole) of sulfamide and 50 milliliters (ml.) of pyridine. Stir the solution and concurrently heat to reflux until gassing is no longer detected in the bubble detector. Remove the solvent in vacuo on a rotary evaporator. Dissolve resulting pale brown solid residue in hot ethanol-water. Slurry produced solution with charcoal and, subsequently filter off the charcoal. Cool the filtrate to about 8° C. There are thus obtained 9.0 g. (80% by weight yield based on the starting weight of the 2,2'-diamino biphenyl) of 5H-dibenzo[c,e][1,2,7]thiadiazepine-6,6-dioxide, as a white solid with a melting point (M.P.) of 218° to 218.5° C.

*Analysis.*—Calculated for $C_{12}H_{10}N_2S$: C, 58.5; H, 4.1; N, 11.4; O, 13.0; S, 13.1. Found: C, 57.8; H, 4.2; N, 11.4; O, 13.2; S. 13.1.

*Example 2.—3,9-di-trifluoromethyl-5H-dibenzo[c,e][1,2,7]thiadiazepine-6,6-dioxide*

Charge a flask equipped with a stirrer and a condenser attached to bubble detector with 5 g. (0.0156 mole) of 2,2′-diamino-4,4′-di-trifluoromethyl biphenyl, 1.95 g. (0.0203 mole) of sulfamide and 40 ml. of pyridine. Stir the solution and concurrently heat to reflux until gassing is no longer detected in the bubble detector. Remove the solvent in vacuo on a rotary evaporator. Dissolve resulting pale brown solid residue in hot ethanol-water. Slurry produced solution with charcoal and, subsequently filter off the charcoal. Cool the filtrate to about 8° C. There are obtained 2.3 g. of 3,9-di-trifluoromethyl-5H-dibenzo[c,e][1,2,7]thiadiazepine-6,6-dioxide, M.P. 254° to 255° C.

*Analysis.*—Calculated: C, 44.0; H, 2.1; O, 8.4; S, 29.8; F, 8.4; N, 7.3. Found: C, 44.2; H, 2.3; N, 7.2.

*Example 3.—3,9-dimethyl-5H-dibenzo[c,e][1,2,7]thiadiazepine-6,6-dioxide*

Charge a flask equipped with a stirrer and a condenser attached to a bubble detector with 5 g. (0.023 mole) of 2,2-diamino-4,4′-dimethyl biphenyl, 2.1 g. (0.030 mole) of sulfamide and 40 ml. of pyridine. Stir the solution and concurrently heat to reflux until gassing is no longer detected in the bubble detector. Remove the solvent in vacuo on a rotary evaporator. Dissolve resulting pale brown solid residue in hot ethanol-water. Slurry produced solution with charcoal and, subsequently filter off the charcoal. Cool the filtrate to about 8° C. There are obtained 4.3 g. of 3,9-dimethyl-5H-dibenzo[c,e][1,2,7]thiadiazepine-6,6-dioxide, M.P. 273° to 275° C.

*Analysis.*—Calculated: C, 61.3; H, 5.1; N, 10.2; O, 11.7; S, 11.7. Found: C, 61.4; H, 5.4; N, 10.5; O, 11.8; S, 11.8.

*Example 4.—N,N′-sulfuryl-4,5-diamino-phenanthrene*

Dissolve in a flask equipped with a stirrer and a condenser attached to a bubble detector 2.1 g. (0.01 mole) of 4,5-diamino-phenanthrene and 2.9 g. (0.03 mole) of sulfamide in 50 ml. of pyridine. Stir the resulting solution and concurrently heat to reflux. Reflux (with stirring) until gassing is no longer detected in the bubble detector. Remove the solvent in vacuo on a rotary evaporator. Dissolve the resulting material in hot ethanol-water. Slurry produced solution with charcoal and, subsequently, filter off the charcoal. Cool the filtrate to about 8° C. There is thus obtained N,N′-sulfuryl-4,5-diamino-phenenthrene.

*Example 5.—Bis-acetone imine of 2,2′-diaminobiphenyl*

Admix in a flask (equipped with a Dean-Stark Tube) 8.0 g. (0.043 mole) of 2,2′-diaminobiphenyl, 46.5 g. (0.0 mole) of acetone, 200 ml. of benzene and 0.1 g. of p-toluene sulfonic acid. Reflux the resulting admixture until water ceases to condense in the Dean-Stark Tube. Remove the solvent (benzene) in vacuo. The residue of bis-amine can be used directly without further purification.

*Example 6.—N,N′-diisopropyl-2,2′-diaminobiphenyl*

Place in a suitable hydrogenation bottle 6.5 g. (0.025 mole) of crude bis-acetone imine of 2,2′-diaminobiphenyl, 0.1 g. of 5% palladium-carbon catalyst and 150 ml. of isopropanol. Hydrogenate at room temperature, i.e. about 20° C. and at 50 p.s.i.g. until the theoretical amount of hydrogen is absorbed. Filter off the catalyst and remove the solvent in vacuo. Crystallize the resultant residue from ethanol to give N,N′-diisopropyl-2,2′-diaminobiphenyl.

*Example 7.—3,9-dichloro-5H-dibenzo[c,e][1,2,7]thiadiazepine-6,6-dioxide*

Charge a flask (equipped with a stirrer and a condenser attached to a bubble detector) with 5.1 g. (0.02 mole) of 2,2′-diamino-4,4′-dichlorobiphenyl, 2.9 g. (0.03 mole) of sulfamide and 60 ml. of pyridine. Stir the solution and concurrently heat to reflux until gassing is no longer detected in the bubble detector. Remove the solvent in vacuo on a rotary evaporator. Dissolve the resulting residue in hot ethanol-water. Slurry produced solution with charcoal and subsequently filter off the charcoal. Cool the filtrate to about 8° C. 3,9-dichloro-5H-dibenzo[c,e][1,2,7]thiadiazepine-6,6-dioxide is thus obtained.

*Example 8.—2,3,9,10-tetrachloro-5H-dibenzo[c,e][1,2,7]thiadiazepine-6,6-dioxide*

Charge a flask (equipped with a stirrer and a condenser attached to a bubble detector) with 6.45 g. (0.02 mole) of 2,2′-diamino-4,4′,5,5′-tetrachlorobiphenyl, 2.88 g. (0.03 mole) of sulfamide and 75 ml. of pyridine. Stir the solution and concurrently heat to reflux until gassing is no longer detected in the bubble detector. Remove the solvent in vacuo on a rotary evaporator. Dissolve the resulting residue in hot ethanol-water. Slurry produced solution with charcoal and subsequently filter off the charcoal. Cool the filtrate to about 8° C. 2,3,9,10-tetrachloro-5H-dibenzo[c,e][1,2,7]thiadiazepine-6,6-dioxide is thus obtained.

It is thought that the invention and its advantages will be understood from the foregoing description. It is apparent that various changes may be made in the process and in its products without departing from the spirit and scope of the invention or sacrificing its material advantages, the process and the products hereinbefore described being merely illustrative of embodiments of the invention.

What is claimed is:

1. A process for producing thiadiazepinedioxides which comprises heating to a temperature of from 50° to 200° C. an admixture in a solvent of reactants (a) sulfamide and (b) a compound of the formula

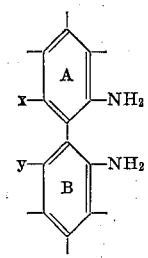

wherein each of A and B is, independently, a member selected from the group consisting of monocarbocyclic aryl and a nucleus of a condensed ring system, each ring condensed on the nucleus comprising from 5 to 6 ring members and each condensed ring system being at most bicyclic; and x and y, together, form a member selected from the group consisting of —HH—, —CH$_2$— and —CH=CH—;

the solvent being inert to the reactants and the resulting thiadiazepinedioxide of the formula

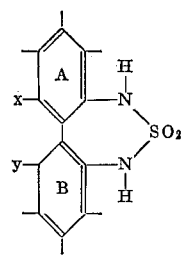

wherein each of A, B, x and y has the same meaning as above.

2. A process for producing thiadiazepines which comprises admixing with a solvent and at a temperature of from −50° to 0° C. reactants (a) sulfuryl chloride and (b) a compound of the formula

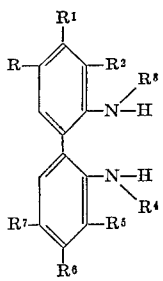

wherein each of R, $R^1$, $R^2$, $R^5$, $R^6$ and $R^7$ is a member selected from the group consisting of hydrogen, chlorine, bromine, fluorine, trifluoromethyl, nitro, lower alkyl and lower alkoxy;
each of R and $R^2$ being other than trifluoromethyl when $R^1$ is trifluoromethyl;
each of $R^5$ and $R^7$ being other than trifluoromethyl when $R^6$ is trifluoromethyl; and
each of $R^3$ and $R^4$ is, independently, a member selected from the group consisting of hydrogen and lower alkyl;
the admixing at the stated temperature being effected with concurrent stirring, and the solvent being inert to both the reactants and the produced dibenzothiadiazepine-dioxide of the formula

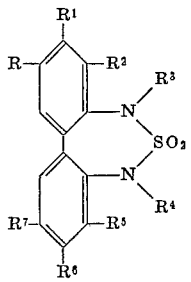

wherein each of R, $R^1$, $R^2$, $R^3$, $R^4$, $R^5$, $R^6$ and $R^7$ has the above-noted meaning.

3. A thiadiazepinedioxide of the formula

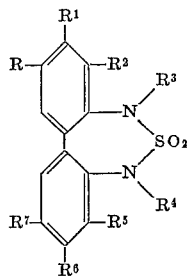

wherein each of R, $R^1$, $R^2$, $R^5$, $R^6$ and $R^7$ is a member selected from the group consisting of hydrogen, chlorine, bromine, fluorine, trifluoromethyl, nitro, lower alkyl and lower alkoxy;
each of R and $R^2$ being other than trifluoromethyl when $R^1$ is trifluoromethyl;
each of $R^5$ and $R^7$ being other than trifluoromethyl when $R^6$ is trifluoromethyl; and
each of $R^3$ and $R^4$ is, independently, a member selected from the group consisting of hydrogen and lower alkyl.

4. 5H-dibenzo[c,e][1,2,7]thiadiazepine-6,6-dioxide.

5. 3,9 - di - trifluoromethyl - 5H - dibenzo[c,e][1,2,7] thiadiazepine-6,6-dioxide.

6. 3,9 - dimethyl - 5H - dibenzo[c,e][1,2,7]thiadiazepine-6,6-dioxide.

7. A compound of the formula

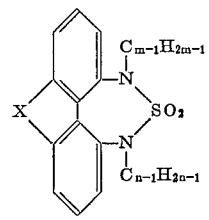

wherein X is a member selected from the group consisting of —$CH_2$— and —CH=CH—; and
each of m and n is, independently, a positive whole number of at most 5.

8. N,N'-sulfuryl-4,5-diaminophenanthrene.

No references cited.

WALTER A. MODANCE, *Primary Examiner.*

JAMES A. PATTEN, *Examiner.*